United States Patent Office 3,167,163
Patented Jan. 26, 1965

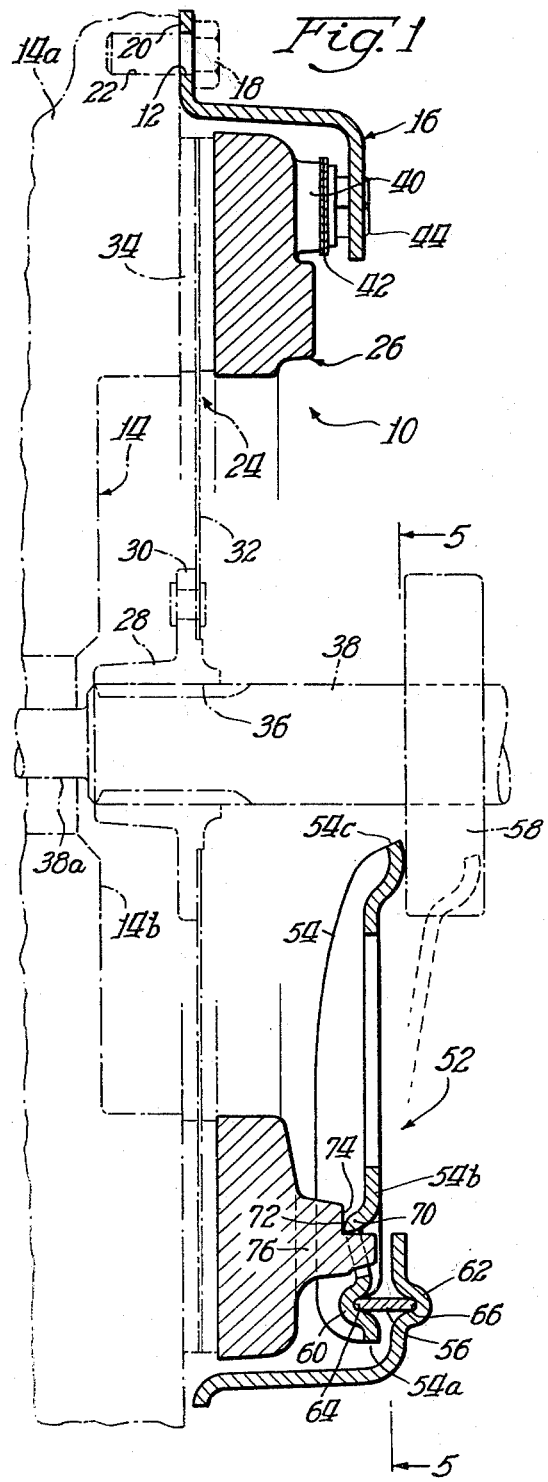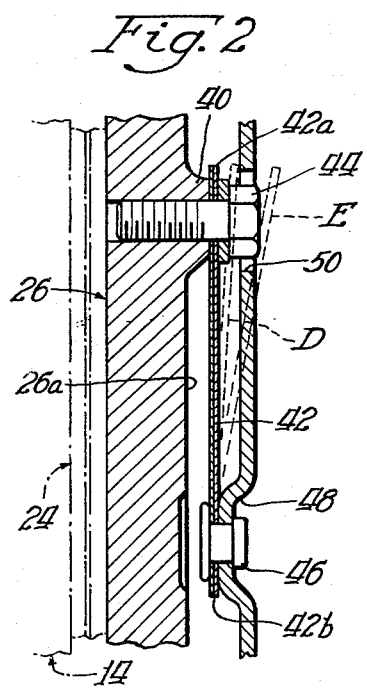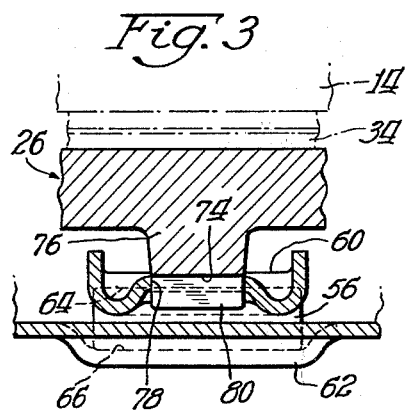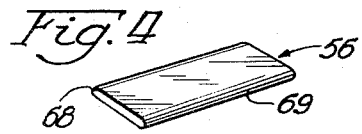
Inventors:
Richard L. Smirl
and Leo W. Cook
By: Joseph W. Malleck Atty.

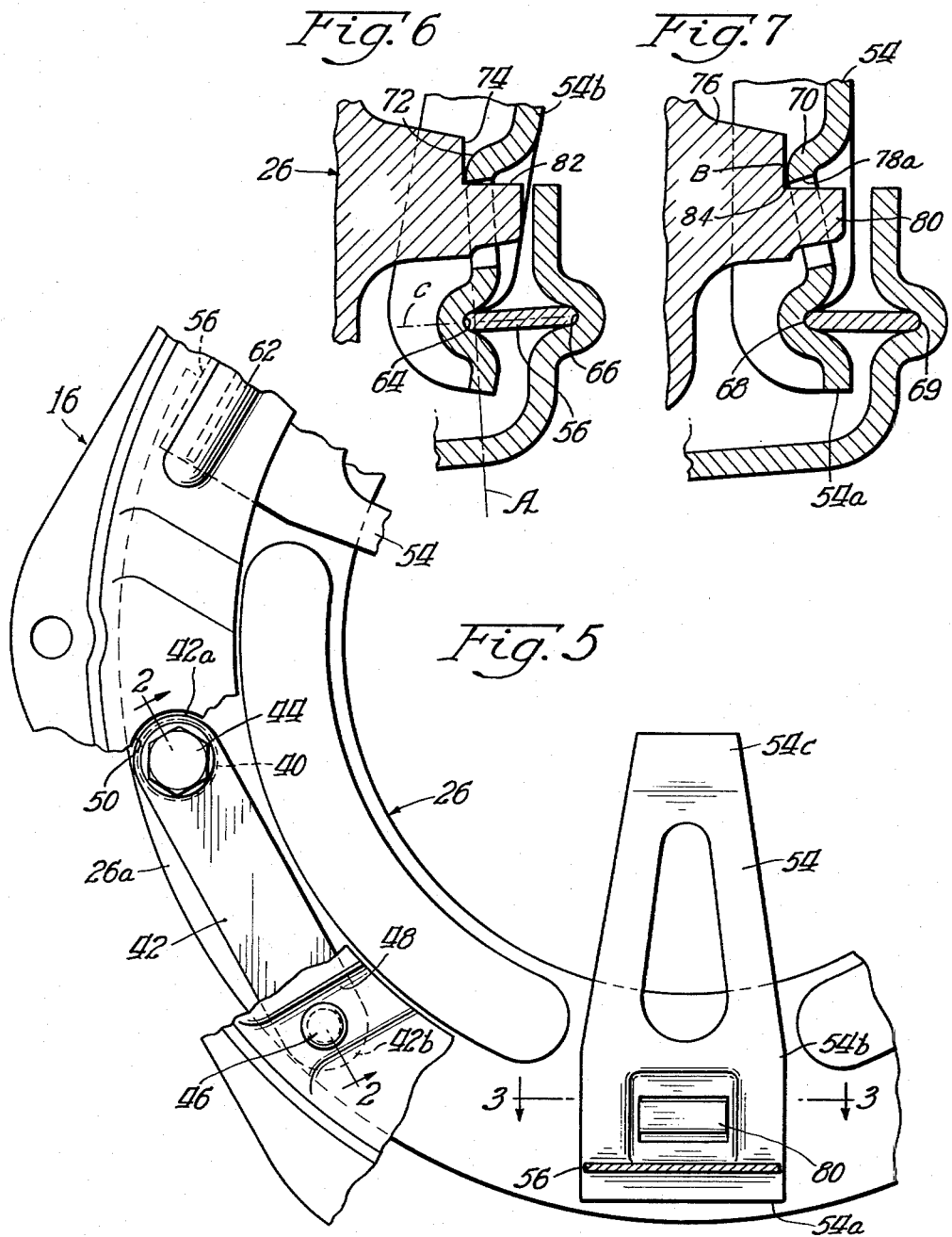

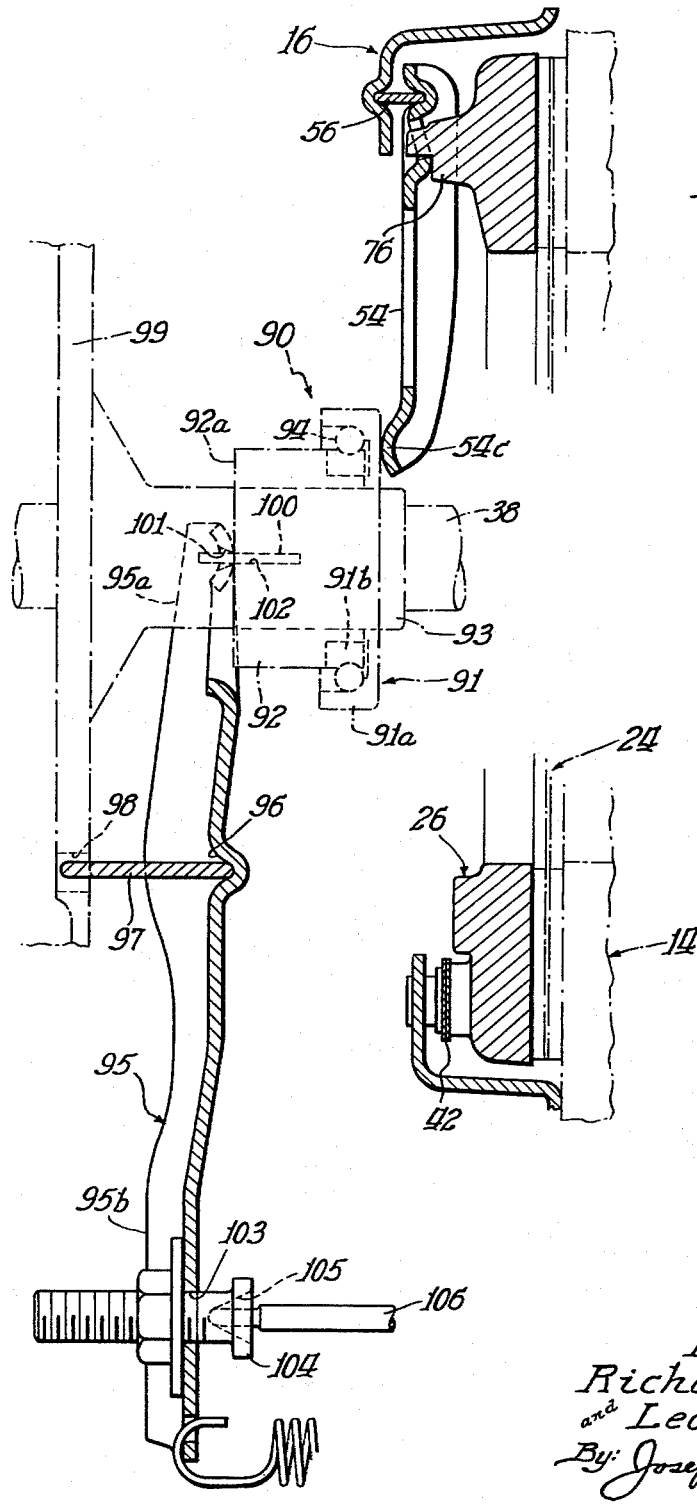

3,167,163
AXIALLY ENGAGING CLUTCH WITH STRUT, SHEET METAL LEVERS, AND COVER PLATE
Richard L. Smirl, La Grange Park, and Leo W. Cook, Chicago, Ill., assignors to Borg-Warner Corporation, Chicago, Ill., a corporation of Illinois
Filed Jan. 2, 1962, Ser. No. 163,629
3 Claims. (Cl. 192—68)

This invention relates generally to power-stop control mechanisms and more particularly to actuating apparatus used in clutch mechanisms of the friction disc type.

Heretofore, clutches of the above type which utilize levers for applying an operative force to a clutch pressure plate in order to provide clutch engagement have been successful for the purposes intended, but have also experienced difficulty in the provision of suitable and economical bearing surfaces against which these levers may function. A typical example of a clutch actuating device, illustrating the presently known art, comprises a plurality of said levers with each lever extending radially so as to be actuated as a group by a central movable collar; each lever has an outer end adapted to bear against an edge or side of openings provided in a clutch cover plate, the plate being secured to a flywheel forming one rotative element of the clutch device. An intermediate portion of each lever is adapted to receive a strut in a swiveling manner for interconnecting the intermediate lever portion with the *pressure plate;* the intermediate portion serves as the "working" part of the lever to apply force to the pressure plate.

In the above construction, it may be readily seen that certain disadvantages exist. The strut cannot be made of simple mill edge stock but must be put through a coining operation to provide a rocking fulcrum; the resulting coined edges are not always satisfactory. Another disadvantage is that the wearing life of the struts may be less as a result of being in contact with the pressure plate; this is due in part to the fact that the pressure plate member develops considerable heat during the engaging operation resulting from frictional contact with the driven disc and transfers this heat to parts in contact therewith. Also, a separate manufacturing operation must be included to provide openings in the cover plate to accommodate the levers; since the edges of each of these openings must act as a fulcrum for the levers, this would dictate expensive requirements in the type of cover plate material utilized for superior operation. If soft metal is used for the cover plate, there is a tendency for the side or edge of the opening contacted by the lever to dimple during clutch operation. The high stresses are also due in part to the fact that the edges of the openings must act to restrain the levers against centrifugal force during operation.

In addition, the particular geometry of the strut and lever relationship is adapted to reduce the amount of swivel of the strut during operation and prevent gouging out of the pressure plate at areas where the lever makes its contact therewith.

The lever assembly contemplated by this invention is adapted to overcome the above problems. Recent tests have shown the instant lever assembly to withstand 1,000,000 cycles of operation with no signs of wear or failure.

Another feature of this invention relates to novel resilient release means adapted to cooperate with the aforementioned lever means and normally urge the pressure plate into the disengaged condition. One example, known to the art, of such resilient release means has comprised flexible metallic straps interconnecting the cover plate with the pressure plate. Such straps have been assembled in a normally flat and unflexed condition and adapted to lie within a radial plane of the device when the pressure plate is in a disengaged position; the straps would be flexed to a non-flat configuration when the pressure plate was moved positively into a clutch engaging position and overcoming the tendency of the strap to remain flat. Upon withdrawal of the positive clutch engaging force, the straps would urge the pressure plate out of engagement with the driven plate assembly.

These straps, although quite successful, are not able to exhibit the improved releasing characteristics and extreme compactness of the instant release means of this invention. It is contemplated herein that the flexible straps be preformed in an offset unflexed condition prior to assemblage and during assemblage the straps are moved to a lesser offset condition and thereby slightly flexed to give a preload force. Then, for full clutch engagement the straps are substantially flexed and moved into a generally flat condition. This strap construction eliminates parts necessitated by the known art and permits manual removal of the actuating levers since the preload force may be exhausted by hand manipulation to enable the levers to be slipped out. Heretofore, eye-bolts or other parts have prevented such ease of disassembly.

Therefore, the primary object of this invention is to provide an improved clutch actuating assembly for clutches of the friction disc type; a particular feature is the novel use of a strut between the cover plate and pressure plate of the above type friction device.

Another object of this invention is to provide a clutch actuating assembly utilizing a plurality of levers and which are adapted to obviate the necessity of employing the clutch cover plate as a restraint for the levers against centrifugal forces during operation of the clutch.

Still another object of this invention is to provide a clutch actuating assembly for establishing clutch engagement by use of levers, the assembly utilizing the inherent durable materials of a clutch pressure plate to serve as critical bearing portions for the levers, and in which there is obviated any need for special manufacturing procedures in fabricating the clutch cover plate, such as forming lever openings and treatment of the opening walls to prevent failure by localized dimpling.

Another object in accordance with the preceding objects is to provide a clutch actuating assembly utilizing a strut and lever construction whereby the geometry of the strut and lever relationship is adapted to reduce the amount of swiveling of the strut during operation and to prevent gouging out of the pressure plate at areas where the lever makes contact therewith.

Still another object of this invention is to provide a clutch actuating mechanism for establishing clutch engagement which is more economical in manufacture and is adapted to utilize stock materials while affording advantages heretofore not realized by the prior art.

Yet another object of this invention is to provide improved clutch release means adapted to cooperate in a novel manner with the level assemblage of the preceding objects.

Yet still another object is to provide an improved clutch release means including resilient straps interconnecting the pressure plate and cover plate, the straps being offset in the unflexed condition and adapted to be brought toward a flat condition when flexed. The unflexed condition can be varied to give a pre-load force of the straps during assemblage tending to disengage the pressure plate further even though it is fully disengaged.

This invention consists of the novel constructions, arrangements and devices to be hereinafter described and claimed in carrying out the above stated objects and such other objects as will be apparent in the following description of a preferred form of the invention, illustrated with reference to the accompanying drawings, wherein:

FIGURE 1 is an elevational view of a clutch device of the friction disc type, partly broken away and partly in section, and embodying the principles of the instant invention; a clutch engaging lever is shown in its released condition as illustrated in broken out-line;

FIGURE 2 is a fragmentary sectional view taken on the line 2—2 of FIG. 1 of the clutch device illustrating means for releasing the pressure plate member in one postion, as shown in full line, and in another position, as shown in broken line;

FIGURE 3 is a fragmentary sectional view taken substantially along line 3—3 of FIGURE 5;

FIGURE 4 is a perspective view of one of the struts;

FIGURE 5 is a fragmentary side view taken substantially along line 5—5 of FIGURE 1;

FIGURE 6 and FIGURE 7 are enlarged fragmentary views of the lever actuating mechanism for the friction device and illustrating different operative positions thereof; and FIGURE 8 is an elevational view of certain linkage members of a clutch system cooperating to form a part of this invention.

Referring now to the drawings and more particularly to FIGURE 1, the clutch of the present invention is indicated generally by reference numeral 10. A rotatable flywheel 14 of the flat face type is connected to a suitable prime mover such as an internal combustion engine or the like; the flywheel 14 has an outer peripheral portion 14a to which is mounted a clutch cover plate 16 by suitable fasteners 18. The fasteners 18 extend through a plurality of circumferentially spaced openings 12 provided in a radially extending peripheral flange 20 of the cover plate and are received by threaded bores 22 in the flywheel 14 and aligned with the openings 12 of the cover plate 16. The flywheel 14 and cover plate 16 together constitute a housing for clutch parts enclosed therein and may be considered a driving means of the clutch device.

A driven means or rotatable friction driven disc assembly 24 is disposed between said flywheel and a pressure plate member or means 26 in the manner whereby axial actuation of the pressure plate member toward the flywheel will afford frictional gripping of the driven plate assembly therebetween for conjoint rotation. The friction disc assembly 24 may be of conventional construction and comprise a central hub 28 having a radially extending flange 30 to which is secured a plurality of flexible members 32 carrying suitable friction material 34. The hub 28 has a central opening with walls 36 splined to a driven shaft 38, the driven shaft 38 has one end 38a suitably journaled in a central portion 14b of the flywheel.

More specifically and as shown in FIGURE 2, the pressure plate member 26 has an annular configuration with a plurality of bosses 40 formed adjacent its outer peripheral edge 26a extending axially away from the flywheel and are adapted to carry fasteners which may extend partly into aligned openings 50 provided in the cover plate. Flexible and resilient strap members or means 42 are adapted to interconnect said bosses 40 with the clutch cover plate 16 for normally urging the pressure plate member 26 out of contact with the driven disc assembly. One end 42a of each strap is secured to a boss 40 by a cap screw 44; and opposite end 42b of each strap is secured by a fastener 46 to a circumferentially spaced portion 48 of the cover plate. It will be apparent from FIGURE 2 that the flexible straps 42 are adapted to be maintained in a less flexed condition with the pressure plate member 26 removed from the friction driven disc assembly 24 and thereby releasing the clutch mechanism. When the pressure plate member 26 is moved in an axial direction toward the driven plate assembly, the straps are substantially flexed and tend to urge the pressure plate member back to the aforementioned position. Improved features of the strap assembly will be described subsequently.

Turning now more specifically to the means for providing clutch engagement, the actuating mechanism is generally indicated by the reference numeral 52, and comprises in its broadest aspects, a plurality of circumferentially arranged actuating levers 54, each disposed in a radial direction, and a plurality of struts 56 adapted to interconnect the levers with the clutch cover plate 16. The actuating mechanism is adapted to provide unprecedented economy of manufacture while extending the wearing life of the components.

The actuating levers 54 may be pivoted (see FIGURE 1) by application of any suitable force to their radially innermost ends 54c; such force, for example, here being illustrated as applied by a clutch engaging collar 58 which may be slidably moved along said driven shaft 38. The outermost ends 54a of each of the levers are adapted to cooperate with the struts 56 for providing a fulcrum about which the levers may pivot. Pursuant to this purpose, the outermost ends 54a of each of the levers are provided with a recessed portion 60 in general axial alignment with a similar recessed portion 62 on the inner surface of the clutch cover plate 16. These recessed portions 60 and 62 are each provided with a generally cylindrical bearing surface 64 and 66, respectively adapted to engagingly receive mating surfaces 68 and 69 provided on opposite longitudinal edges of the struts (FIGURE 4). Each strut 56 is comprised of a generally flat rectangular metal plate, having a relatively thin thickness, with the opposite longitudinal edges 68 and 69 received by said recesses.

An intermediate portion of each lever 54b, here shown to be somewhat adjacent the outer end 54a of each of the levers, is provided with contoured offset bearing portion 70. The bearing portion is adapted to serve as a "working" portion for each lever whereby force may be imparted to the pressure plate member to provide clutch engagement. Each bearing portion is offset in an axial direction toward the pressure plate member and has a generally cylindrical surface 72 provided thereon for engaging a flat radially disposed surface 74 formed on bosses 76 integrally constructed at one side of the pressure plate member. The bosses 76 extend in a generally axial direction similar to the bosses 40 interconnecting with the cover plate 16 and are generally circumferentially spaced.

An opening 78 is formed in each of the levers adjacent the bearing portion 70 and is adapted to receive a nose 80 formed on each of the bosses 76 and which extend therethrough. A surface 82 on each nose engages a shoulder 84 formed as a side of each of the openings 78 to restrain the levers against radially outward movement during operation of the clutch device resulting from centrifugal forces. The utilization of integral portions of the pressure plate 26 as centrifugal restraints for the levers 54 employs the inherent wearing qualities of the pressure plate in a manner to reduce fabricating costs and obviating independent restraining means.

In operation, the actuating levers 54 are urged to pivot about the struts 56 by movement of the actuating collar 58 to the left, as illustrated in FIGURE 1. The levers will begin to pivot about the center of the curvature of the recessed portion surface 66 with a slight displacement of the center during pivoting due to the rocking action of the strut during such movement. The intermediate portions 54b of each lever are urged against the pressure plate boss 76 to in turn urge the pressure plate member into engagement with the friction disc assembly 24. Due to the arcuate motion of the intermediate portion 54b of each lever and the straight axial path of the pressure plate member 26, it will be seen that there must be a slight relative movement between the intercontacting areas of the lever and the pressure plate member. This is accommodated by action of the cylindrical surface 72 on the bearing portion 70 which literally rolls on the flat surface of the pressure plate member to accommodate this relative displacement.

The geometry of the interrelation of the struts 56 and the levers 54 is of particular significance to this invention. The cylindrical "working" surface 72 of the lever cooperates with the general disposition of the struts to reduce the swiveling thereof and accordingly reduce even further the frictional rubbing that may occur between the edges 68 and 69 of the strut and the interrelating surfaces 64 and 66 of the recesses. As best shown in FIGURE 6, when the levers are in the clutch disengaged position, the "working" surface 72 is chosen as a sector of a circular cylinder whose tangent A at the point of contact B with the pressure plate surface 74 is perpendicular to the plane C of the cooperating strut. The surface 72 forms the sharp shoulder 84 in conjunction with a side wall 78a of the opening 78 in the lever and at the point B. The side wall 78a is substantially perpendicular to the tangent A shown in FIGURE 6; the surface 72 may generally be a quarter sector of a circular cylinder as in FIGURE 6 and should have one termination of the sector tangent to the surface 74 when the levers are in the disengaged position. The wall 78a or portions thereof engage the nose 80 in the position of FIGURE 6 for providing a centrifugal restraint.

As the levers are moved to a clutch engaging position, FIGURE 7, the "working" surface 72 rolls on surface 74 and away from the nose 80. Friction between the latter surfaces is always sufficient to restrain centrifugal forces and permit sliding therebetween. Thus, the shoulder 84 is withdrawn away from the nose 80 to prevent gouging thereof. The strut swivels very slightly since the greatest arcuate travel of the outer end 54a of the lever is in a direction parallel to the plane of the strut.

Turning now more specifically to the straps 42 and their construction, there is shown in FIGURE 2, in broken outline, the general offset disposition of the straps when they are in a partly unflexed condition and adapted to fully disengage the clutch. Each strap may be formed from suitable resilient metal and preformed to be non-flat and have a required longitudinal offset of its ends so that having end 42b fixed to the portion 48 of the cover, the other end 42a will maintain the pressure plate out of engagement with the driven disc assembly 24. Such offset should be adapted to cooperate with clutch actuating mechanism so that the travel of the pressure plate into the fully engaged position will bring the straps into a generally flat flexed condition, as shown in full line in FIGURE 2. This strap construction permits the straps to achieve an improved resilient response under long periods of use and varying temperature conditions. In addition, the offset preformed straps permit a more compact clutch arrangement since the bosses 40 and cap screws 44 may be generally radially aligned with the fasteners 46 when the straps are in the flexed condition; the bosses 40 and cap screws 44 may then pass into openings 50 in the cover plate when the straps return to the unflexed condition.

Another feature of the straps 42 is that they are distorted partially from the fully unflexed condition during assemblage of the device so that each strap has a pre-load resilient force urging it even further in a clutch disengaging direction even though the pressure plate is fully disengaged. This intermediate pre-load position can be seen in FIGURE 2 wherein the broken outline of the lever is labeled D; the strap 42 would normally assume the position E, as shown in FIGURE 2, if it were fully unflexed and in the original preformed offset condition.

The straps 42 are chordally disposed so that they may transmit rotative drive to the pressure plate in a direction along the longest extent of their configuration and also serve to resiliently maintain the levers and struts in operative assembled relationship with the pressure plate and cover plate, as shown in FIGURE 1.

Turning now to FIGURE 8, there is shown an elevational view of linkage utilized in operating the actuating levers 54. The novel linkage disclosed particularly cooperates with the straps 42 for providing an economical linkage system; the component parts thereof are maintained in operative relation by virtue of the resilient straps interconnecting the pressure plate 26 and the cover plate 16. The linkage system comprises a thrust bearing means 90 which includes an annular bearing 91 carried on a bearing sleeve 92 which in turn is slidably mounted on an intermediate shaft 93 surrounding the driven shaft 38. The bearing 91 may be of conventional construction comprising inner and outer races 91a and 91b with roller bearings 94 therebetween. The race 91a is adapted to be in touching engagement with the inner end 54c of each lever.

An operating lever 95 is mounted in engagement with the thrust bearing means 90 for reciprocal actuation thereof. The operating lever 95 has an intermediate portion provided with a shallow recessed seat 96 receiving one end of strut 97; the strut has an opposite end received in a seat 98 formed in a stationary fixture 99, such as the housing of a transmission, the strut having its opposite ends received in said seats 96 and 98 to provide a fulcrum about which said operating lever may pivot. The inner end 95a of the operating lever is provided with a forked portion which is adapted to engage side 92a of the bearing carrier sleeve. The fork end 95a is adapted for touching engagement with the side 92a and is maintained in general alignment therewith by pins or tabs 100 received in aligned openings 101 and 102 provided in the forked portion 95a and bearing sleeve respectively.

An outer end 95b of the operating lever is provided with an opening 103 adapted to receive a thrust plug 104 therein. The thrust plug 104 has a conically shaped seat 105 adapted to receive the end of a thrust rod 106 in touching engagement. The thrust rod may be actuated by any suitable means such as a servomotor (not shown) for moving the outer end 95b of the operating lever to the left and thereby imparting leverage force to the bearing carrier sleeve 92 which in turn will apply an actuating force to the levers 54 to urge the pressure plate toward clutch engagement.

A particular feature of the above linkage system is the manner in which the various bearing areas of the operating lever as well as the bearing areas of the plurality of levers 54 are economically constructed. Without the use of the straps 42, the linkage system would be subject to disconnection since the various interengaging portions thereof are not held positively but are for the most part in touching engagement. It is by virtue of the resilient nature of the straps 42 which provide a retention force which is relayed from levers 54 to the bearing means 90, to the operating lever 95 and in turn to the thrust member 106 for maintaining the linkage system in operative relationship.

In review, it can be seen from the above description, that the cover plate may be fabricated from ordinary materials without fear of encountering special brinelling problems during operation. This also considerably reduces the expense in the number of fabricating operations required for the cover plate.

A particular advantage of this invention is the simplicity and ease of manufacture of each of the struts 56. They may be formed from mill edge metal stock and cut to length without the need for any special coining operation on their bearing edges.

In addition, the levers 54 are each restrained by bearing surfaces provided on the pressure plate member and which conventionally is of a more durable material to provide improved wear surfaces. This is also attributed in part to the use of denser materials for the pressure plate member in order to withstand the high operating temperature conditions resulting from direct frictional contact with the friction driven assembly.

While a certain preferred embodiment of the present invention has been specifically disclosed, it is understood that the invention is not limited thereto, as many variations will be readily apparent to those skilled in the art and the invention is to be given its broadest possible interpretation, within the terms of the following claims.

We claim:

1. A clutch device, comprising in combination: rotatable driving and driven means, rotatable pressure plate means adapted to urge said driving and driven means together for conjoint rotation and having at least one flat surface parallel to the plane of rotation and at least one surface generally transverse to the plane of rotation; a cover plate drivingly connected with said driving means; means comprising a plurality of resilient straps interconnecting said pressure plate means and said cover plate, each strap being disposed chordally with respect to a circumference inscribing said clutch device, each strap having a preformed condition such that opposed ends thereof are offset relative to the plane of rotation of said pressure plate means, said straps being assembled in said device tending to urge said pressure plate means out of engagement with said driven means and toward said offset condition; stop means adapted to limit movement of said pressure plate means during disengagement so that said straps will be flexed from their pre-formed condition even during the fully disengaged condition of the pressure plate means; a plurality of levers mounted adjacent said cover plate and adjacent said cover plate means adapted for urging said pressure plate means towards said driven means, each of said levers having one end adapted to receive an engaging force sufficient to overcome the effect of said resilient strap means and an intermediate portion adapted to serve as a working portion which engages said pressure plate means in a clutch engaging direction; and a plurality of flat struts each adapted to serve as a fulcrum for one of said levers, and said intermediate portion of each lever having a sector of a circular cylindrical surface adapted to roll against said pressure element flat surface which is within the plane of rotation, each lever having a lip adapted to engage said pressure element transverse surface *only* during the disengaged condition of the device as urged by centrifugal forces, said lever cylindrical surface being arranged so that a tangent at the point of contact of said cylindrical surface with the pressure element flat surface will be generally perpendicular to the plane of the associated strut during the disengaged condition of the device whereby swivel movement of each strut will be reduced during lever movement, said cylindrical surface being adapted to roll on said contacting pressure element surface in a direction away from said transverse surface so that friction is reduced between the lever and the pressure element during the engaged condition of the device.

2. In a clutch device an actuating assembly for providing clutch engagement, comprising in combination: a cover plate, a pressure plate means disposed adjacent said cover plate, and having adjacent surfaces with one flat surface disposed in the plane of rotation of said pressure element and the other surface disposed transverse to the plane of rotation of the pressure element, a plurality of levers spaced from said cover plate with each lever arranged for reception of an engaging force at one end thereof, said levers each having an intermediate portion adapted to serve as a working portion which engages said pressure plate means in a clutch engaging direction, said intermediate portions each having a cylindrical surface adapted to engage the flat surface of said pressure plate means, a plurality of struts disposed in compression between said cover plate and other lever end and adapted to serve as a fulcrum for each of said levers, said struts and intermediate portions of said levers being associated so that upon engaging actuation of said levers said cylindrical surface of the intermediate portions will roll upon said flat surface of the pressure plate means in a radially inward direction of the device whereby frictional contact between the pressure plate means is substantially reduced, said transverse surface of the pressure plate means being adapted to restrain and engage said levers during the disengaged condition of the device and prevent outward movement of the levers due to centrifugal forces in such condition, said assembly being particularly characterized in that said struts, cover plate, levers and pressure plate means are adapted so that there is rolling contact therebetween.

3. In a clutch device, an actuating assembly for providing clutch engagement and disengagement, the combination comprising: a rotatably driven sheet metal cover; a pressure plate disposed within and drivingly associated with said cover for applying force to promote clutch engagement and carrying a flat reactance surface; a thrust element movably supported by said clutch device carrying a flat surface and adapted to receive an actuating force to promote clutch engagement; a plurality of flat struts having at least one pair of parallel rounded edges; a plurality of sheet metal levers disposed within said cover and cooperating with said struts to operably interconnect said thrust element, pressure plate and cover, each of said levers having one end provided with a semi-cylindrical deformation with the convex side of said deformation in loose rolling contact with the flat surface of said thrust element, each of said levers having an intermediate portion provided with a semi-cylindrical deformation with the convex side thereof in loose rolling contact with the flat surface of said pressure plate, the other end of each of said levers and said cover each being provided with a semi-cylindrical deformation arranged in an aligned pair with the concave sides thereof facing each other and effective to rockably receive said opposite edges of said strut in loose contact, said aligned deformations in said cover and lever also providing rigidity to resist deflection thereof under load; and resilient means remote from said levers effective to continuously urge said pressure plate and thrust element toward each other to maintain said loose rolling contact of said assembly.

References Cited in the file of this patent

UNITED STATES PATENTS

| | | |
|---|---|---|
| 2,250,394 | Reed | July 22, 1941 |
| 2,277,557 | Nutt | Mar. 24, 1942 |
| 2,296,535 | Nutt | Sept. 22, 1942 |
| 2,300,187 | Wemp | Oct. 27, 1942 |
| 2,366,643 | Nutt | Jan. 2, 1945 |
| 2,920,731 | Zeidler | Jan. 12, 1960 |

FOREIGN PATENTS

| | | |
|---|---|---|
| 536,864 | Great Britain | May 29, 1941 |
| 1,165,638 | France | June 2, 1958 |